United States Patent [19]
Berry et al.

[11] 3,926,518
[45] Dec. 16, 1975

[54] OPTICAL SCANNING SYSTEM
[75] Inventors: Peter J. Berry, Glasgow, Scotland; Gerald J. Maguire, Stevenage, England
[73] Assignee: Xerox Corporation, Stamford, Conn.
[22] Filed: May 21, 1974
[21] Appl. No.: 472,023

[30] Foreign Application Priority Data
May 23, 1973 United Kingdom............... 24563/73

[52] U.S. Cl. ................................. 355/8; 355/68
[51] Int. Cl.² .................................. G03G 15/28
[58] Field of Search ............................. 355/68, 8

[56] References Cited
UNITED STATES PATENTS
3,279,312  10/1966  Rogers ................................. 355/68
3,649,120   3/1972  Pfeifer ................................. 355/68
3,679,306   7/1972  DuBois ................................ 355/68

Primary Examiner—John M. Horan

[57] ABSTRACT

An optical scanning system for scanning a document to be copied providing an optical path and including a document illuminating means, light intensity detector means having a line of sight at least adjacent said optical path, and control means arranged to respond to signals from said light intensity detector means to adjust the intensity of illumination passing along said optical path.

1 Claim, 3 Drawing Figures

OPTICAL SCANNING SYSTEM

BACKGROUND OF THE INVENTION

The invention relates to scanning systems, primarily, though, not exclusively, for document copying machines. The invention has particular application where an image of an original is projected onto a movable photosensitive surface.

A copying machine such as that described in U.S. Pat. No. 3,062,109 uses an optical system comprising two fixed mirrors with a lens between the mirrors, the stationary original being illuminated by lamps on a movable lamp carriage, and light from the original being screened from the projection system except for a small slit between the lamps. U.S. Pat. No. 3,301,126 describes a document copying machine in which the whole of the stationary original is illuminated during exposure, and scanning is achieved by oscillating one of the mirrors of the projection system about an axis in its plane. It has been proposed, for example in U.S. Pat. No. 3,642,366 to have a more compact image projection system in which two mirrors are moved in different directions at speeds relating to the speed of movement of the photosensitive surface.

In copiers having optical systems of the kind already mentioned and generally any copier relying on a photosensitive response, it may be desirable to adjust the illumination of the document to be copied to maintain as far as possible a constant irradiance at the image plane, that is at the photosensitive surface of photoreceptor. This constant irradiance is desirably achieved for various original document background reflectances and as far as practical in some cases despite aging or other forms of deterioration of the optical system.

In the above copier, copies provided depend for their definition or contrast on the difference of light intensity between light and dark parts of an original document to be copied so that adjustment of the illumination of the document may not be critical. In a copier as described in U.S. Pat. No. 3,084,043, the definition of copies made depends in effect on the actual value of the illumination received, rather than a differential value, so that ensuring near constant irradiance at the photoreceptor surface for differing types of original becomes even more important.

SUMMARY OF THE INVENTION

It is an object of the present invention to provide an optical scanning system including a light intensity detector means.

According to the present invention there is provided an optical scanning system for scanning a document to be copied providing an optical path and including document illuminating means, light intensity detector means having a line of sight at least adjacent said optical path, and control means arranged to respond to signals from said light intensity detector means to adjust the intensity of illumination passing along said optical path.

An optical slit may be provided in the optical path, and the light detecting means arranged adjacent said slit. DRAWINGS The invention will now be described by way of example with reference to the accompanying drawing in which.

DESCRIPTION

Figure 2:
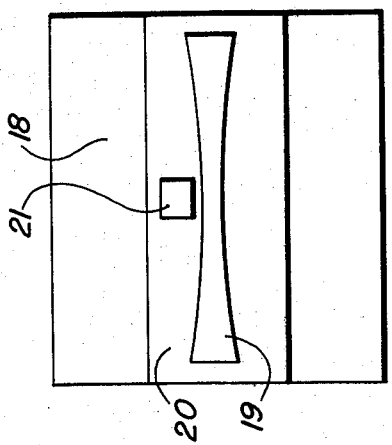
FIG. 2 shows a view taken along the line A—A of FIG. 1.
Figure 1:
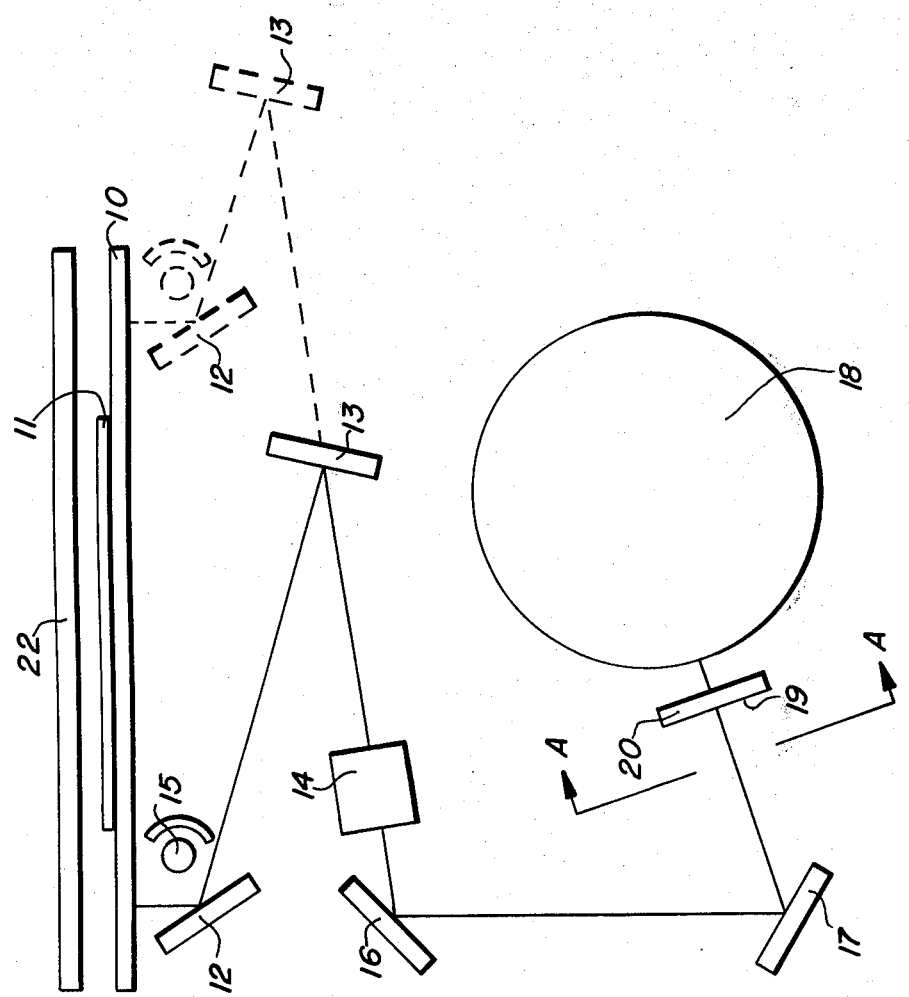
FIG. 1 shows a schematic view of an optical scanning system.

Referring to the drawing, a platen 10 is provided to support a document 11. A scanning mirror system includes two movable mirrors 12 and 13 shown in their extreme left and right positions in full and dotted outline respectively. The mirror 13 is arranged to move at half the speed of the mirror 12 during scanning to maintain the optical distance constant between the document 11 and a lens 14. A tubular lamp 15 extending across the platen 10 parallel to the mirror 12 moves with the mirror 12. The lamp 15 is provided as illumination means to illuminate the document 11 through the platen 10 during scanning.

An optical path extending from the platen 10 to the lens 14 continues beyond the lens to be reflected in sequence by mirrors 16 and 17 towards a photoreceptor drum 18. An optical slit 19, better seen in FIG. 2, is provided in a cover plate 20. The slit is used to restrict the image field and thus preserve image quality. A light intensity detector 21, see FIG. 2, is mounted on the plate 20 adjacent the slit 19. A platen cover 22 is laid over the document 11.

The configuration or shape of the slit is as shown, being narrower at its mid-point than at its extremities. This shape, as is already known in the art, is primarily to compensate for the uneven distribution of illumination inherent in the lamp 15. Other shapes can be provided for lamps having different distribution characteristics. The photoreceptor 18 may be as fully described and illustrated in U.S. Pat. No. 3,084,043, in which a latent image is formed xerographically on the photoreceptor 18 and then developed by a liquid development process.

In general operation, the document 11 is scanned by the sweep of the mirrors 12 and 13 from left to right forming a latent image of the document on the photoreceptor 18 which rotates in synchronism with the movement of the mirrors 12 and 13. The intensity of illumination incident on the document in the present example is determined by the magnitude of current supplied to the lamp 15. To provide good copies of originals of widely differing reflectance properties, we alter the illumination of the originals according to their reflectance. In the embodiment, this is achieved by a pre-scan of the document 11 and by controlling the current to the lamp 15 in dependence upon the maximum intensity of light received at the detector 21 throughout the pre-scan.

In the described embodiment, the detector 21 is described as being adjacent the photoreceptor 18. This is a preferred position so that any variations or deteriorations of the components or the optical system will be taken into account by the operation of the detector 21. The detector 21 could be placed in some other part of or adjacent to the optical path and more than one detector could be provided across the width of the slit for example.

Circuit means (not shown) are provided to receive signals from the detector 21 corresponding to the intensity of the illumination received by the detector 21. The circuit means are arranged and designed to respond to the detector signals and to control the current to the lamp 15 appropriately. Alteration of the current is arranged as far as possible to ensure there is, at the detector 21 and hence at the photoreceptor, constant irradiance irrespective of the background of the document to be copied. During pre-scan the circuit means is arranged to respond to signals corresponding to the maximum illumination received at the detector 21 and then adjust the current to the lamp 15 to alter the irradiance at the photoreceptor to some predetermined desired level.

Thus, it will be appreciated that during or as a result of the pre-scan the lamp current is automatically adjusted by the circuit means to provide the irradiance at the photoreceptor at the desired level irrespective of the actual reflectance of the background of the document to be copied. As an illustration, if the background is of a low reflectance value the current to the lamp 15 is increased and maintained at this increased value for the copying or operational scan of the mirrors 12 and 13.

Difficulties can arise with the arrangement so far described, if the document to be copied is smaller than the area scanned during the pre-scan. If the platen cover surface is of higher reflectance than the background of the document, the current to the lamp 15 will be adjusted to a lower value than is required to provide the desired irradiance value at the photoreceptor when the actual document is copied. If the platen cover is deliberately made of low reflectance so as to be much less reflective than backgrounds of all documents likely to be copied, then in the situation where the document is smaller than the pre-scanned area, the area around a copy of the document produced by the apparatus will be very dark.

We have overcome this problem in a number of ways including:

First, we arrange to scan only a part of the platen area, say near one end. In operation, we ensure that any document to be copied which is smaller than the pre-scanned area is positioned adjacent the said one end or the area actually scanned during the pre-scan as the case may be.

Secondly, we arrange as above to scan only part of the area, at least in effect, by arranging to delay the response of the circuit means to signals from the detector until after the pre-scan has commenced. Additionally, we can arrange for the circuit means to respond only for a short period after its delayed response that it is a period shorter than is required for the remainder of the scan.

Figure 3:
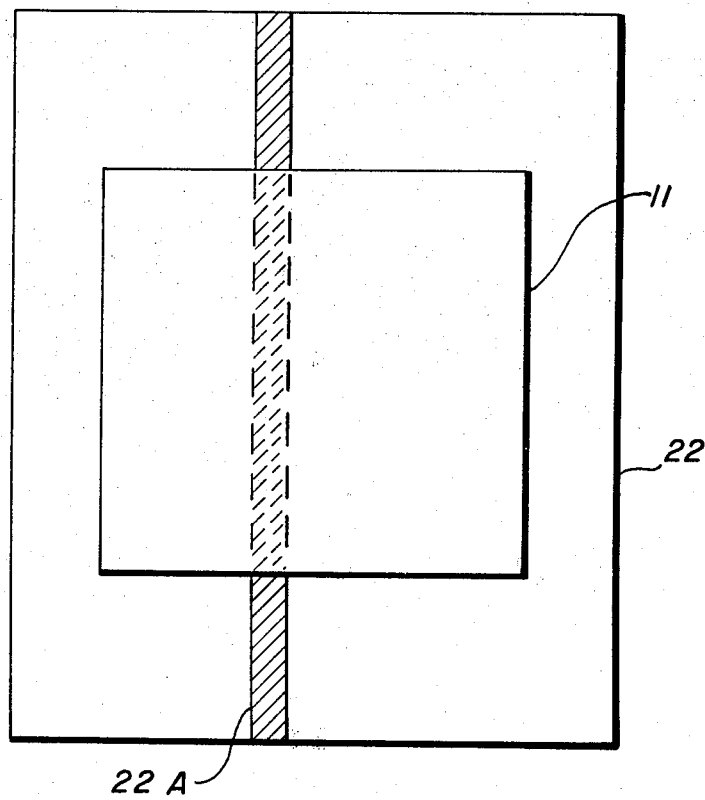
FIG. 3 shows a plan view the underside of a platen cover of FIG. 1.

Third, we arrange for the platen cover (see FIG. 3) to have a low reflectance area 22A extending along its length corresponding to the line-of-sight of the detector 21 in FIG. 2. Copies of a document smaller than the copying scanned area made with such a platen cover shows a dark line at its upper and/or lower edge. Such copies are, however, generally more satisfactory than copies mentioned above which would show a darkened area all around the copy of the document. A black low reflectance line or area can be used although in a preferred arrangement we use a generally grey line. The choice of reflectance value is largely dependent on selecting the lowest value to provide an increasing margin for a range of backgrounds of documents to be copied and as high a reflectance value as possible to reduce the non-aesthetic impact of the dark or relatively dark lines which appear as a record of the black or grey platen line on copies of documents produced by the apparatus.

Fourth, we use with a white platen cover an auxiliary light intensity detector positioned to receive light reflected from an edge strip of the platen cover. We arrange that the edge strip is not covered by documents to be copied. Using signals from the auxiliary detector and signals from the detector 21 we arrange for the circuit means to ignore, in effect, the illumination intensity of light reflected from the platen cover. In one arrangement, we arrange for the circuit means to respond during the pre-scan to the minimum difference between signals from the auxiliary detector and the detector 21, when there is a difference.

The minimum difference is representative of the maximum intensity of light being received by the detector 21 when a document is being scanned. When or where the document is absent there is no significant difference between the signals from the auxiliary detector and the detector 21 and signals from the detector 21 are ignored during such times.

The invention has been described in relation to a pre-scan, and it will be appreciated that embodiments can be provided in which the adjustment of the illumination can be varied during a copying scan rather than a pre-scan. In such an embodiment, a faithful copy of the original would not be provided but intelligence, such as writing, which might otherwise not be reproduced as the background of the original varied along its length, for example, is reproduced on the copy.

In the described arrangement the illumination received by the photoreceptor is adjusted by varying the output of the lamp. It will be appreciated that other means can be used as alternatives or in addition. Such other means include adjusting an effective aperture in the optical path provided in the form of an adjustable slit for example, and providing a neutral density filter in the optical path which is controlled by said control means. In arrangement where the copy developing system is as described in U.S. Pat. No. 3,084,043, the electrical bias on the photoreceptor can be adjusted by the control means to compensate, as it were, for variations of light intensity from the said predetermined desired level. In such an arrangement the bias is increased when the intensity of illumination is below said desired level, for example.

One preferred copying machine includes a scanning system as described above and a liquid development technique of the kind described in U.S. Pat. No. 3,084,043. In such a machine we arrange the scanning system to pre-scan documents to be copied and to cause adjustment of the intensity of illumination, or the effective intensity of illumination if the photoreceptor bias is adjusted as mentioned. The adjustment as described is made in accordance with the intensity of light passing along the optical path during pre-scan generating signals at the light sensitive detector during the pre-scan. The pre-scan can be arranged to take place during one stroke of the scanning mirrors and a copying scan to take place during an opposite stroke.

While the invention has been described with reference to the structure disclosed, it is not confined to the details set forth, but is intended to cover such modifications or changes as may come within the scope of the following claims.

What is claimed is:

1. An optical scanning system for scanning a document to be copied providing an optical path and including document illuminating means, light intensity detector means having a line of sight adjacent to said optical path, and control means arranged to respond to signals from said light intensity detector means to adjust the intensity of illumination passing along said optical path, a xerographic photoreceptor having an electrical bias voltage impressed thereon, and
means to vary said bias voltage on said photoreceptor in response to said control means.

* * * * *